ପ3,231,620
PRODUCTION OF CARBONYL COMPOUNDS
Colin Bertie Cotterill and Fred Dean, both of Norton-on-Tees, England, assignors to Imperial Chemical Industries Limited, London, England, a corporation of Great Britain
No Drawing. Filed June 23, 1961, Ser. No. 119,017
Claims priority, application Great Britain, July 1, 1960, 23,068/60
4 Claims. (Cl. 260—597)

This invention relates to the production of carbonyl compounds by the oxidation of olefines.

It is already known to oxidize olefines to glycols and epoxides by means of hydrogen peroxide using organic acids, e.g. formic acid or acetic acid, or inorganic acids, e.g. osmic acid or tungstic acid, as catalysts. It is also known to oxidize olefines to carbonyl compounds by means of air, using palladous and copper salts as catalysts.

We have now found that by an alternative method of oxidation olefines may be converted to carbonyl compounds by direct oxidation.

Thus, according to the present invention, there is provided a process for the direct oxidation to a carbonyl compound of an olefine in which at least one hydrogen atom is attached to one of the doubly-bonded carbon atoms, which comprises the step of contacting the said olefine with hydrogen peroxide in the presence of a salt of palladium, platinum, ruthenium, rhodium, osmium or iridium and of an aqueous mineral acid.

The process of the present invention may be applied to a wide range of olefines, for example aliphatic olefines having 2 to 8 carbon atoms, provided that a hydrogen atom is attached to at least one of the doubly-bonded carbon atoms. Thus, by the process of the present invention, ethylene may be oxidized to acetaldehyde, propylene may be oxidised to acetone and butene-1 may be oxidised to methyl ethyl ketone. In general, there is a decrease in reaction rate of the olefine employed as its molecular weight increases. Additionally, the reaction is in general most readily applicable to those olefines which contain a terminal double bond.

The process is applicable to olefines other than aliphatic mono-olefines. For example, di-olefines may be employed; for instance if butadiene is used as the starting material, crotonaldehyde is obtained. Also, it is possible to use cyclic olefines such as cyclohexene; this compound is converted by the present process to cyclohexanone. Again, it is possible to employ olefines containing one or more aromatic groupings. Thus, by the process of the present invention, styrene is converted to acetophenone.

The process of the present invention is facilitated by the use of elevated temperatures. However, it is inadvisable to use temperatures in excess of 100° C. and in general temperatures up to 50° C. are preferred. The use of reaction temperatures higher than those stated has the disadvantage that, for example, undesirable side reactions then tend to occur. For instance, the hydrogen peroxide employed may be decomposed to water and oxygen.

The acidity of the reaction mixture is preferably 0.02 N to 1.0 N, for example 0.2 N. If the reaction mixture contains an insufficient quantity of acid it is likely that the olefine absorption will occur too rapidly and there is then a danger of precipitating the catalytic metal from its salt.

The metal salts most suitable for use in the process of the present invention are those of palladium, palladous chloride being particularly convenient.

The hydrogen peroxide for use in the present process may be liberated in situ by the use of barium peroxide. The barium salt produced may be converted to barium carbonate by treatment with carbon dioxide and barium peroxide may be regenerated by roasting the precipitated barium carbonate in air.

The process of the present invention may be carried out at atmospheric pressure or at elevated pressures, the latter increasing the rate of reaction. For example, elevated pressures up to 30 atmospheres are suitable.

The mode of operation of the process of the present invention may be illustrated by describing the oxidation of propylene to acetone, the reaction conditions falling within the limits defined above. The reaction may take place in the following manner: propylene and palladous chloride may react together to give a complex which is decomposed by water according to the overall equation:

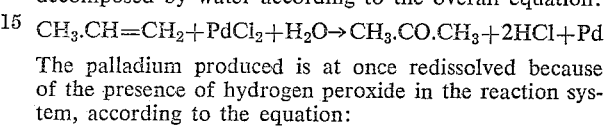

The palladium produced is at once redissolved because of the presence of hydrogen peroxide in the reaction system, according to the equation:

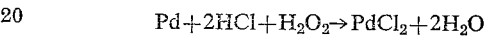

Thus, it will be seen that palladous chloride is decomposed and immediately re-formed under the reaction conditions.

*Example 1*

A reactor charge was made up as follows. A quantity of 0.3 gm. of palladous chloride was dissolved in 40 ml. of N hydrochloric acid. 30 ml. of hydrogen peroxide containing 34.0 gm. of $H_2O_2$ per 100 ml. were added and the solution was made up to a volume of 200 ml. with water. The solution so obtained was 0.2 N with respect to hydrochloric acid, and contained 10.2 gm. (0.3 mole) of hydrogen peroxide.

The solution was heated to 40° C. in a glass reactor fitted with a hollow cruciform stirrer and propylene was circulated at a rate of 10 liters per hour through the liquid by the centrifugal action of the stirrer, revolving at 1500 r.p.m. Propylene removed from the gas circulation system by reaction was replaced by fresh propylene.

After the reaction had been in progress for 21 hours, the hydrogen peroxide in the reaction mixture had been completely consumed. At this stage, metallic palladium was precipitated and the absorption of propylene ceased. The total amount of propylene absorbed was 4545 ml., i.e. 0.19 mole. The reaction mixture was filtered to remove palladium metal and the filtrate was then diluted to 250 ml. in a graduated flask. The amount of acetone present, determined by the oximation procedure, was 10.9 gm. i.e. 0.19 mole. Thus the yield of acetone, based upon the amount of propylene absorbed, was 100%.

The beneficial result obtained by providing for the presence of hydrogen peroxide in the reaction system may be seen from the fact that only 40 ml. of propylene would have been absorbed if the reaction had proceeded solely according to the equation:

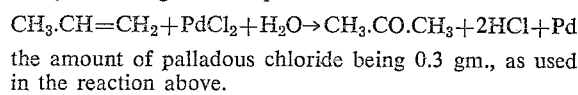

the amount of palladous chloride being 0.3 gm., as used in the reaction above.

*Example 2*

This example illustrates the use of barium peroxide as the source of the oxidizing agent. A slurry of 60 gm. of barium peroxide, having a purity of 87%, was produced in 180 ml. of water. Carbon dioxide was passed in a slow stream through this slurry which was maintained at a temperature of 0 to 5° C. Samples of supernatant liquid were withdrawn periodically and analyzed for hydrogen peroxide by titration with standard potassium permanganate. It was found that, after operating for 225 minutes, the peroxide content of the liquid had reached a maximum value. The slurry was then filtered, the filter cake of barium carbonate was washed with two portions of water, each having a volume of 10 ml., and the washings were combined with the aqueous filtrate. The combined filtrate and washings contained the equivalent of 3.6 gm. of hydrogen peroxide, i.e. 0.106 mole. To this liquid was added a solution of 0.30 gm. of palladous chloride in 40 ml. of N hydrochloric acid.

The mixture obtained in this way was used for the oxidation of propylene by the method already described in Example 1. After an induction period, 1.34 liters (0.056 mole) of propylene were absorbed in 10 hours. 2.6 gm. (0.045 mole) of acetone were produced, this corresponding to a yield of 80%, based on the propylene consumed.

We claim:

1. A process for the direct oxidation of propylene to acetone which comprises the step of contacting the propylene with hydrogen peroxide at a temperature which is at most 100° C. in the presence of a reaction medium consisting essentially of palladous chloride and an aqueous mineral acid, the acidity of the reaction mixture being at least 0.02 N.

2. A process as claimed in claim 1 in which the temperature is at most 50° C.

3. A process as claimed in claim 1 in which the hydrogen peroxide for use in the process is liberated in situ by the use of barium peroxide.

4. A process according to claim 1 wherein the oxidation is conducted at a pressure which is at most 30 atmospheres and wherein the aqueous mineral acid is present in an amount such that the acidity of the reaction mixture is between 0.02 N and 1.0 N.

References Cited by the Examiner

UNITED STATES PATENTS 3,080,425  3/1963  Smidt et al. _____ 260—597

FOREIGN PATENTS 1,207,594  9/1959  France.
1,210,009  9/1959  France.

LEON ZITVER, *Primary Examiner.*

CHARLES B. PARKER, LORRAINE A. WEINBERGER, *Examiners.*

D. D. HORWITZ, *Assistant Examiner.*